Figure 3:
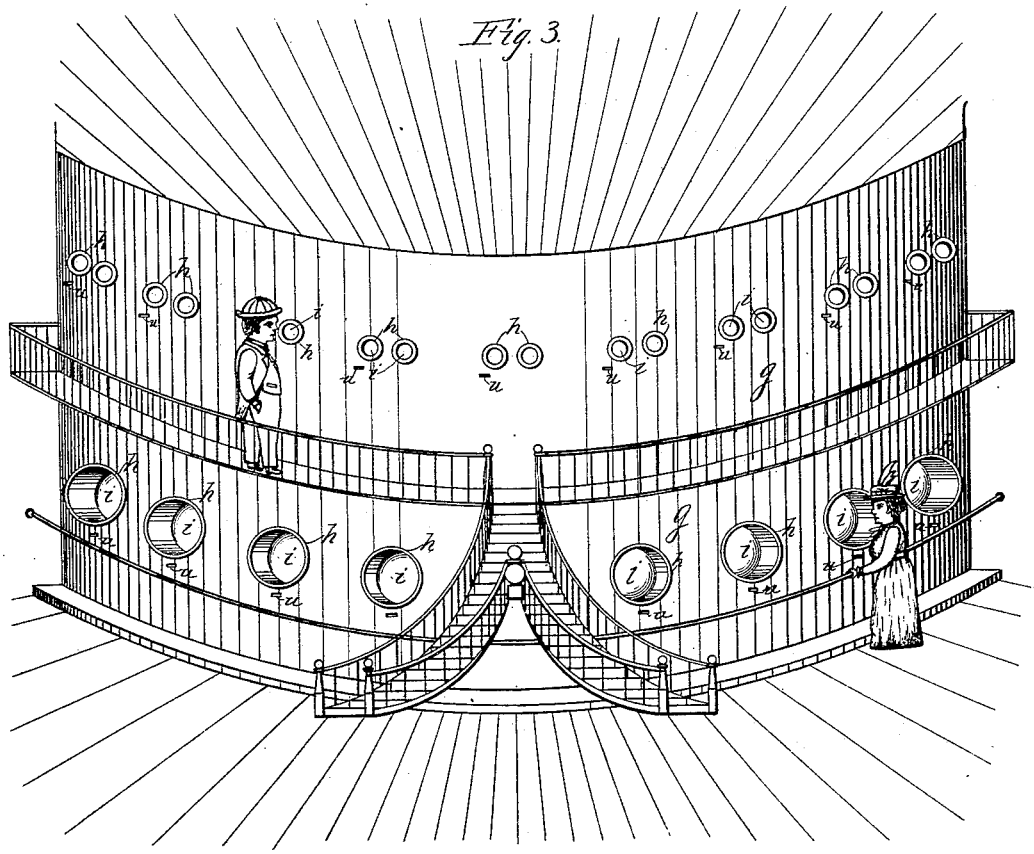

No. 677,271. Patented June 25, 1901.
C. F. RITCHEL.
PEEP SHOW.
(Application filed Nov. 27, 1900.)
(No Model.) 3 Sheets—Sheet 1.
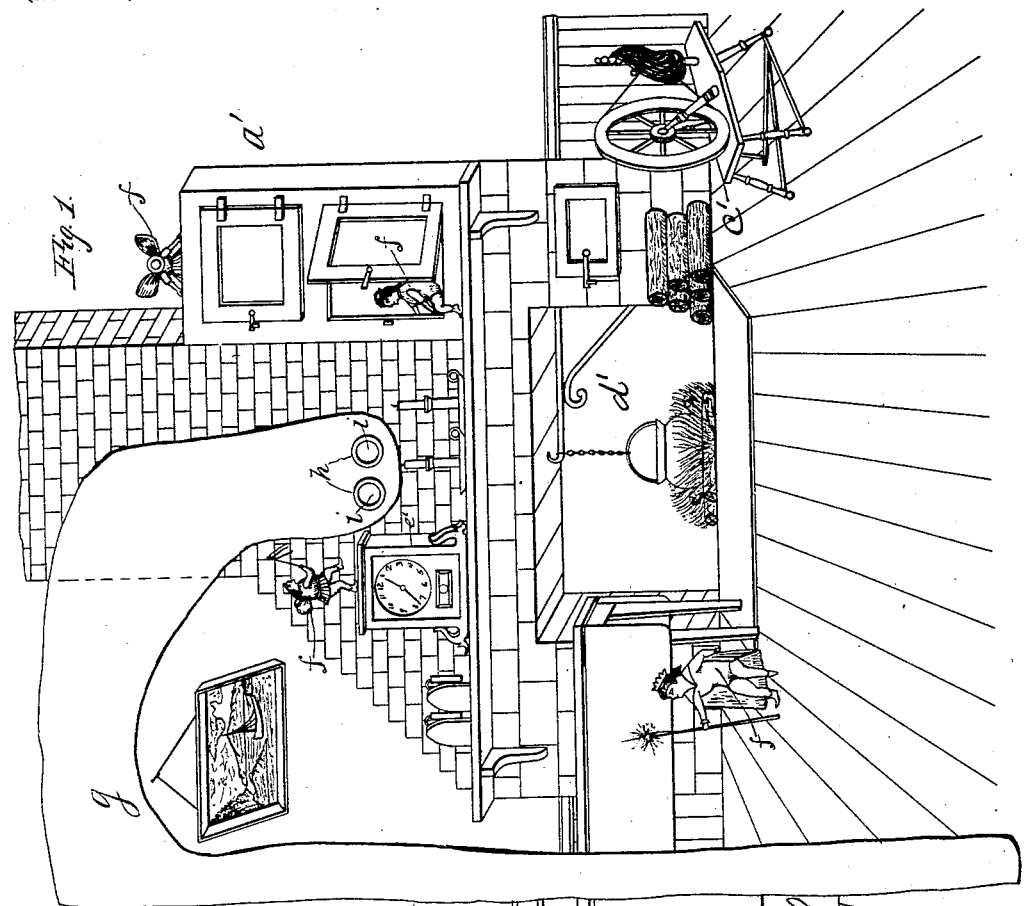
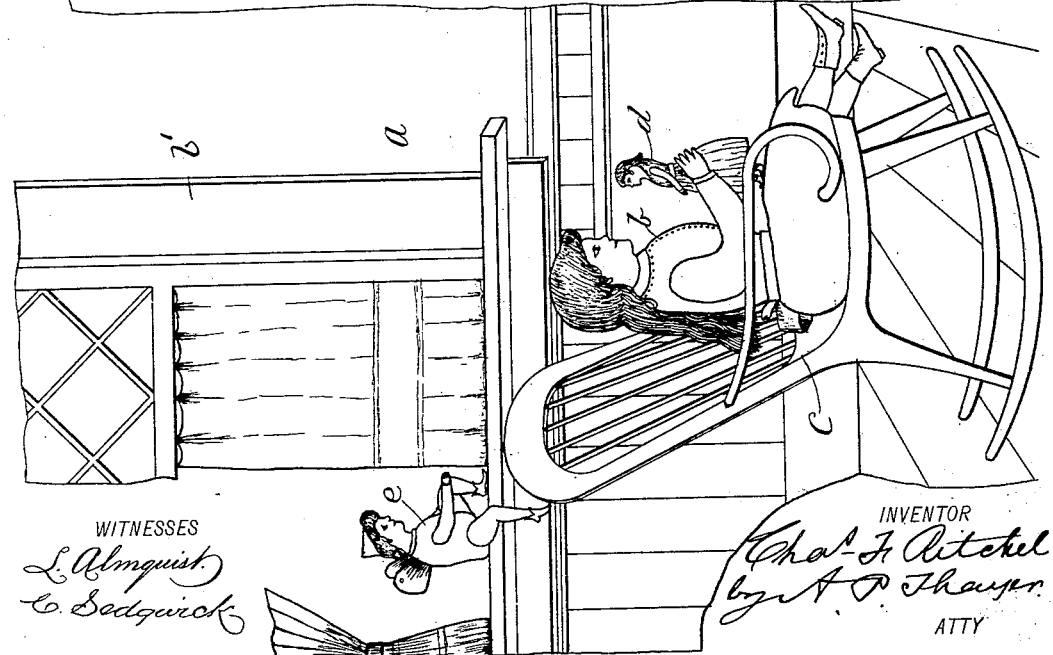
WITNESSES
L. Almquist
C. Sedgwick
INVENTOR
Chas. F. Ritchel
by A. P. Thayer
ATTY

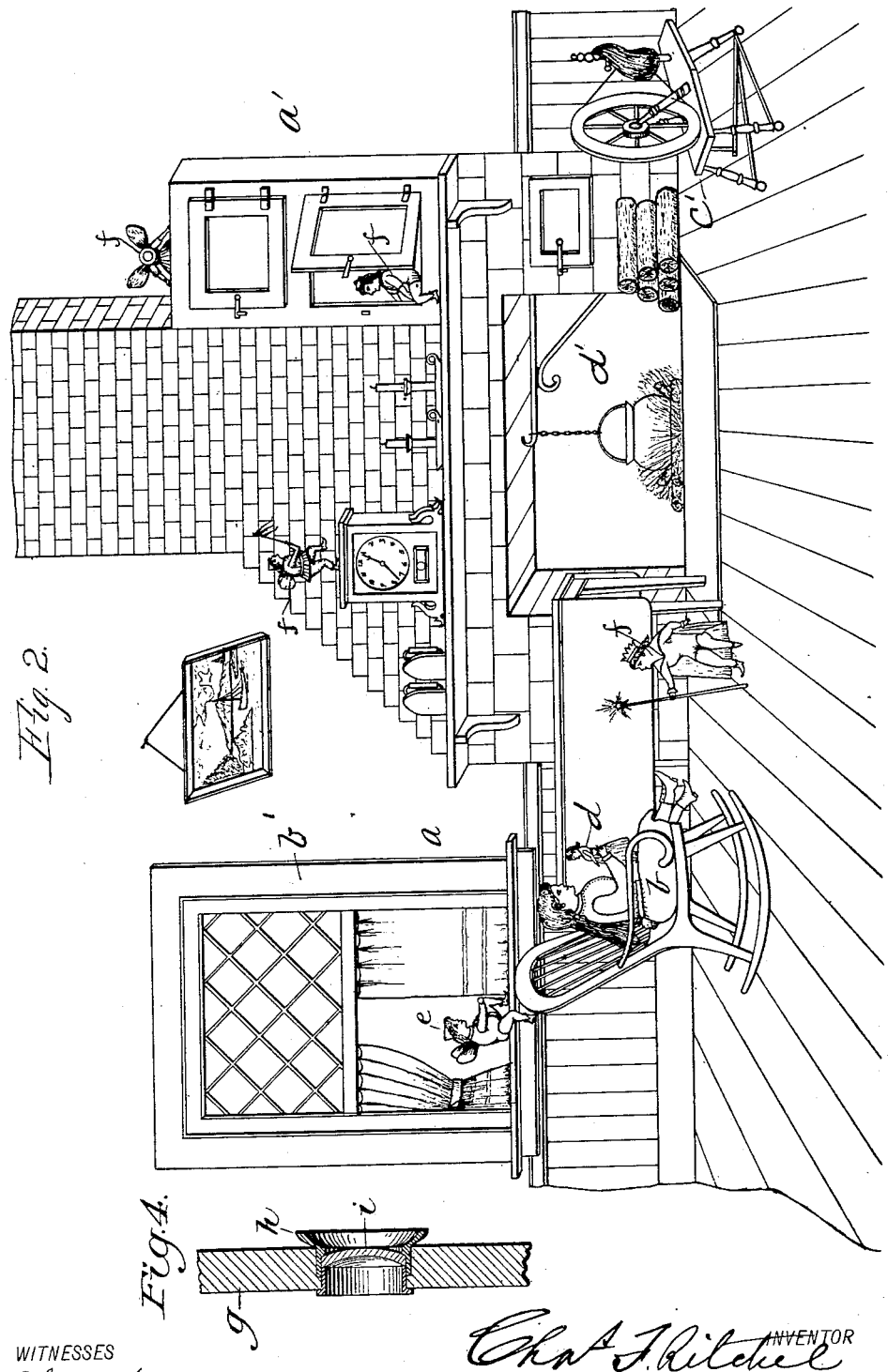

No. 677,271. Patented June 25, 1901.
C. F. RITCHEL.
PEEP SHOW.
(Application filed Nov. 27, 1900.)
(No Model.) 3 Sheets—Sheet 3.

WITNESSES
L. Almquist
C. Sedgwick

INVENTOR
Chas. F. Ritchel
by A. P. Thayer
ATTY

UNITED STATES PATENT OFFICE.

CHARLES F. RITCHEL, OF BRIDGEPORT, CONNECTICUT, ASSIGNOR OF THREE-FOURTHS TO HOBERT E. FRENCH, JAMES E. CAMP, AND GEORGE IRVING, OF SAME PLACE.

PEEP-SHOW.

SPECIFICATION forming part of Letters Patent No. 677,271, dated June 25, 1901.

Application filed November 27, 1900. Serial No. 37,913. (No model.)

*To all whom it may concern:*

Be it known that I, CHARLES F. RITCHEL, a citizen of the United States of America, and a resident of Bridgeport, county of Fairfield, and State of Connecticut, have invented certain new and useful Improvements in Peep-Shows, of which the following is a specification.

My invention consists of apparatus whereby through the employment of small children for actors the children appear in the diminutive size commonly attributed to fairies at play, and with a full-grown person or persons, and preferably of excessive size, included a fairy scene may be represented in which the fairies are at play in the presence of and with a child or children of normal size, the object being to provide amusement for children, as hereinafter described, reference being made to the accompanying drawings, in which—

Figure 1 represents in the left-hand part a full-size natural view of part of a scene suitable for a peep-show, and in the right-hand part the figure represents the rest of the scene in the diminutive sizes, giving the character of fairies to the children of the play. It also shows part of the inclosure through which the scene is to be viewed. Fig. 2 represents the whole scene in the diminutive character. Fig. 3 indicates a front elevation of an inclosure for the scene which is to be viewed through the lenses represented in the wall. Fig. 4 is a detail in section through one of the glazed peep-holes on an enlarged scale.

The part $a$ of Fig. 1 of the drawings represents part of an interior scene which I have chosen as an example in natural view, the figure $b$ being intended to represent an adult woman, and preferably of larger than the average size, seated in a chair $c$ of excessive size for such a person, but dressed as a child to indicate a child in the chair of an adult, and all the other inanimate objects of the scene, as the window $b'$, spinning-wheel $c'$, fireplace $d'$, clock $e'$, and the rest, are to be proportionally larger than the normal sizes. The figures $d$, $e$, and $f$ are intended to represent children of size and age adapted for the play and dressed as fairies. The part $a'$ of said figure represents the rest of the scene as it appears when the objects of excessive size are reduced to normal size and the actors are reduced so that by comparison with the objects of apparent normal size the beholder is vividly impressed with a sense of a scene of real fairy beings at play.

It is to be noted that owing to certain limitations that must necessarily be observed respecting the drawings it is not feasible to represent the differences in proportions of the natural view and the deceptive view as conspicuously as they will appear in the practical use of the invention, but the principle is apparent.

The scene and the actors are to be located within an inclosure, of which $g$ represents parts of the inclosing wall, to be viewed through peep-holes $h$, glazed with concavo-convex lenses $i$, the radius of whose respective surfaces constitute them diminishing-lenses or any lens or combination of lenses that will reduce without spherical aberration or distortion.

Single openings with lenses large enough for both eyes of the observer may be used, as in the lower part of Fig. 3, or twin lenses of smaller dimensions may be provided for each eye, as in the upper part of said figure and as in Fig. 1.

What I claim as my invention is—

In a peep-show the combination of a stage, a scene thereon comprising familiar objects adapted for use in a play, but being in excessive size, said stage adapted for actors in a play, an inclosure of said stage, and peep-holes in said inclosure glazed with concave lenses adapted to reduce the objects of excessive size to normal size and to reduce the actors to diminutive size, whereby by the employment of one or more actors of excessive adult size, and others of the size of small children the comparison of the actors thus apparently reduced with the familiar objects of apparent normal size presents the appearance of a child or children at play with fairies.

Signed by me at Bridgeport this 5th day of November, 1900.

CHARLES F. RITCHEL.

Witnesses:
A. P. THAYER,
C. SEDGWICK.